April 21, 1953 N. E. LINDENBLAD Re. 23,647

HIGH-FREQUENCY ELECTRON DISCHARGE DEVICE
OF THE TRAVELING WAVE TYPE

Original Filed June 25, 1947 3 Sheets-Sheet 1

INVENTOR.
NILS E. LINDENBLAD

BY Harry Turnick
ATTORNEY

INVENTOR.
NILS E. LINDENBLAD

BY Harry Tunick
ATTORNEY

INVENTOR.
NILS E. LINDENBLAD

BY Harry Turnick
ATTORNEY

Reissued Apr. 21, 1953 Re. 23,647

UNITED STATES PATENT OFFICE 23,647

HIGH-FREQUENCY ELECTRON DISCHARGE DEVICE OF THE TRAVELING WAVE TYPE

Nils E. Lindenblad, Princeton, N. J., assignor to Radio Corporation of America, a corporation of Delaware Original No. 2,578,434, dated December 11, 1951, Serial No. 756,851, June 25, 1947. Application for reissue August 19, 1952, Serial No. 305,311

26 Claims. (Cl. 315—3)

Matter enclosed in heavy brackets [ ] appears in the original patent but forms no part of this reissue specification; matter printed in italics indicates the additions made by reissue.

This invention relates to improvements in electron discharge devices of the growing wave type, especially adapted for use at ultra and very high frequencies.

An object of the invention is to provide an improved electron discharge device capable of amplifying a wide band of high frequencies and which does not depend upon resonance phenomenon in the output circuit.

Another object is to provide a growing wave (sometimes called a traveling wave) type tube having an outer metallic shell or envelope surrounding a helical or spiral line, and which is of such geometric configuration as to gradually change the characteristic impedance of the helical line from a relatively high value in the center of the line to a lower value near the ends of the line.

A further object is to enable the terminals of a helical conductor in a growing wave type tube to match the characteristic impedance of connecting coaxial transmission lines.

A still further object is to provide a wide band helical line type of growing wave amplifier tube for use at high frequencies, which prevents or minimizes the occurrence of parasitics at very high frequencies outside the range of frequencies to be amplified.

Figure 1:
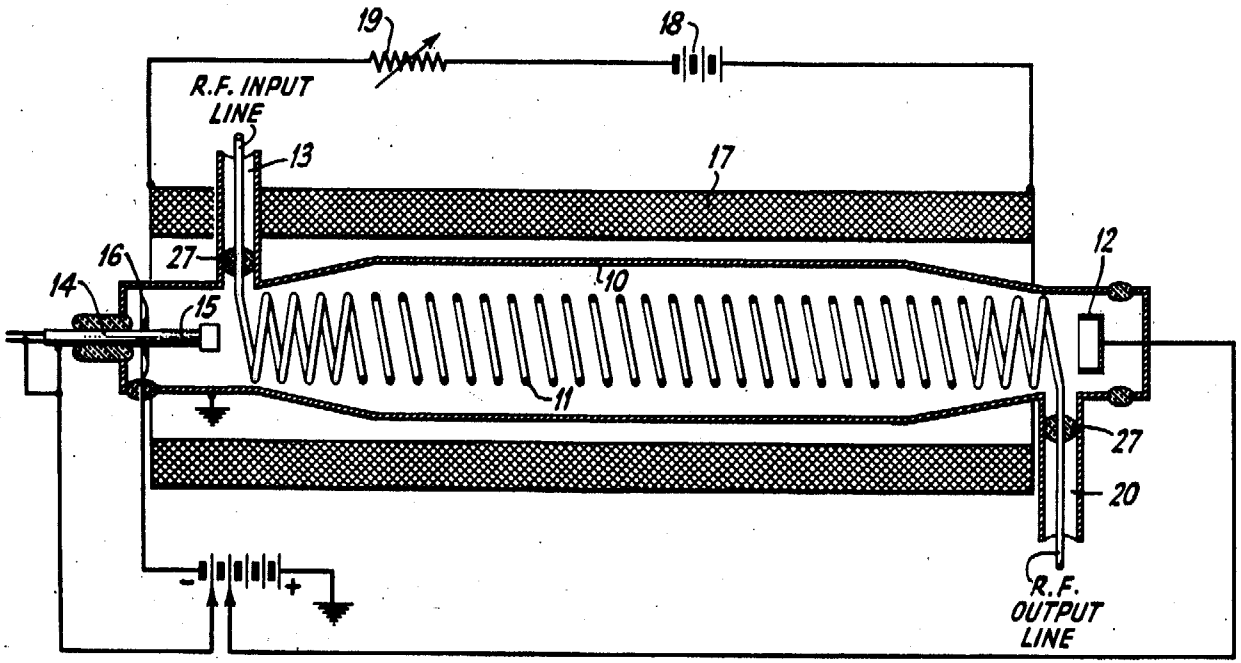
Figure 3:
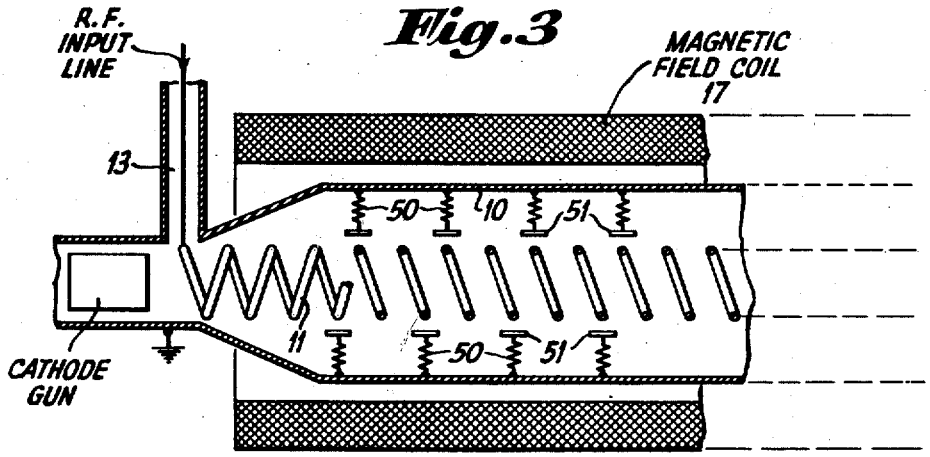
Figure 4:
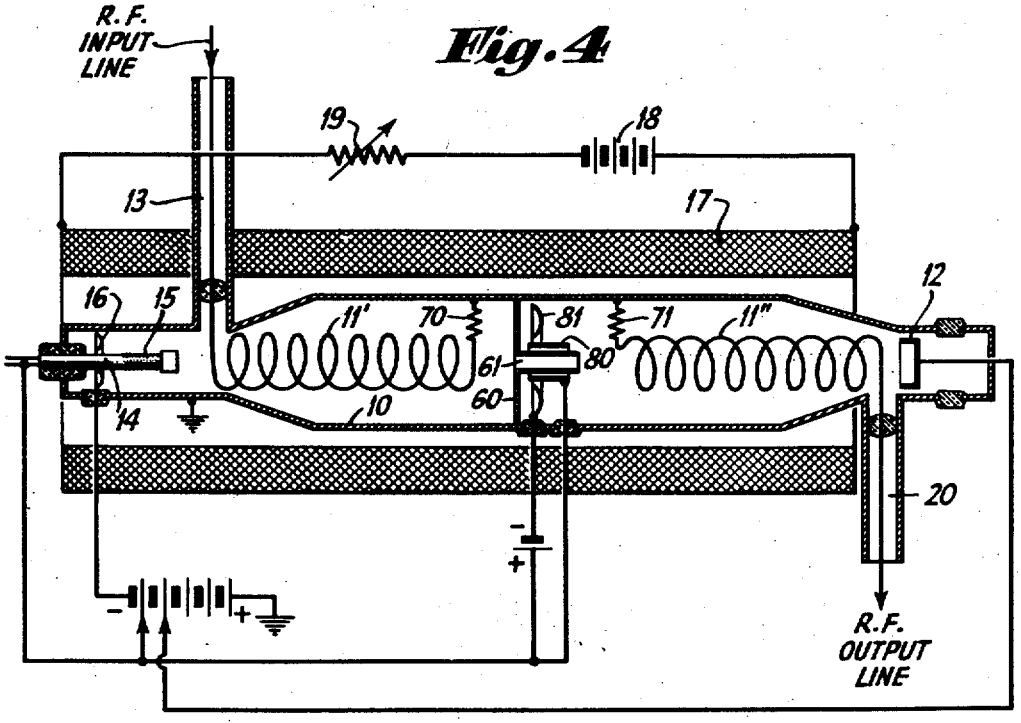

A detailed description of the invention follows in conjunction with the drawings, wherein:

Figs. 1, 3 and 4 show three different embodiments of the invention, and

Figs. 2a to 2f inclusive show six different types of coupling or impedance transformation circuits which can be used between the terminals of the amplifier tube of the invention and the connecting coaxial transmission lines.

Referring to Fig. 1 in more detail, there is shown a wide band growing wave amplifier tube of the broad general type described in my U. S. Patent No. 2,300,052, granted October 27, 1942, and in my copending application Serial No. 724,330, filed January 25, 1947, in which a helical conductor surrounds a stream of electrons and is in energy coupling relation thereto. The improved amplifier tube of Fig. 1 comprises a tubular non-magnetic metallic envelope or shell 10 which surrounds a helical conductor 11. A suitable *primary* cathode *14* is provided at one end of the tube for furnishing a concentrated heavy stream of electrons which pass *along a path which extends axially* through the interior of the helical conductor 11 [and which]. *The electron stream* is finally collected by a collector electrode 12 at the other end of the tube. This cathode *14* is shown, by way of example, as comprising a cylinder [14] which has only a portion 15 thereof sprayed with electron emitting material. A repeller electrode 16 at the *adjacent to the* cathode [end of the tube] serves to repel or concentrate the electrons emitted by the cathode toward the helical conductor 11. A magnetic field coil 17 surrounds the tube and is energized by a direct current source 18 in series with a variable resistor 19. The field coil is so arranged that the lines of flux extend parallel to the [tube in an axial direction] *path of the electron stream* in order to focus the *stream* [beam] of electrons along the center of the tube. It should be noted that the repeller electrode 16 is maintained at a negative potential relative to the cathode, while the collector electrode 12 is maintained at a slight positive potential relative to the cathode. In the construction of the tube, it may be desirable for the collector electrode to be at a slight negative potential relative to the cathode or even at the same potential as the cathode. The metallic envelope 10 is at ground potential which is equivalent to a positive potential with respect to the cathode. A coaxial transmission line 13 supplies radio frequency input current to one terminal of the helical conductor 11, while the amplified current is abstracted from the other terminal of the helical conductor 11 by an output coaxial line 20.

In order to assure a vacuum tight shell or envelope 10, glass beads 27 are provided in the input and output coaxial lines at a location near shell 10. Obviously, the glass beads can be positioned at any suitable location.

The helical conductor 11 is a plurality of wavelengths long peripherally along the helix at the center frequency of operation. The input energy supplied to the helix 11 by input line 13 causes the electrons passing through the interior of the helix 11 to be bunched. The helix 11 has such dimensions as to couple properly with the electron stream passing along the axis *thereof. In other words, the axial wave velocity along the helix substantially matches the axial velocity of the electron stream passing therethrough.*

The characteristic impedance of this helical conductor is of the order of several hundred ohms, whereas the characteristic impedances of the coaxial lines 13 and 20 are each of the order of 50 ohms, as an example. In order to match the impedances of the coaxial lines 13 and 30 to the characteristic impedance of the helical conductor 11, to prevent the production of standing waves due to reflections at the junction between the lines 13 and 20 and the conductor 11, the metallic envelope 10 is tapered in diameter toward its ends so as to reduce the characteristic impedance of the helical conductor 11 gradually toward its terminals until it is equal to that of coaxial lines to which it is connected. In order to taper the impedance of the helical conductor 11 down to approximately 50 ohms, which is assumed to be the impedance of the coaxial lines, the distance between the last turn of the coil 11 and the surrounding tapering shell 10 should be of the order of the radius of the wire constituting the coil 11. Because this might be difficult to achieve in practical conditions due to the very close spacing required, it will sometimes be more convenient not to taper the characteristic impedance of the helical conductor 11 down as far as 50 ohms, but rather to a value of the order of 100 to 125 ohms, in which case the spacing between the last turn of the coil 11 and the tapering envelope 10 can be larger. In this last case, it is advisable and preferred that a transmission line link having tapering impedance be inserted externally of the tube between the last turn of the coil 11 and the 50 ohms coaxial line.

Figure 2A:
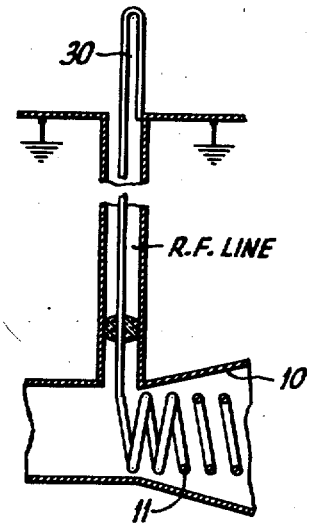
Figure 2B:
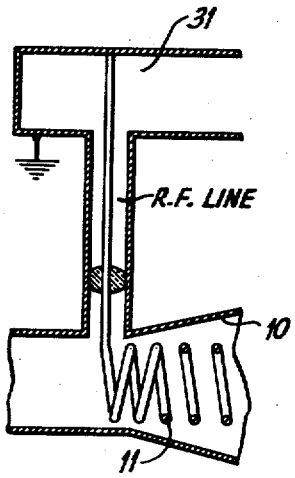
Figure 2C:
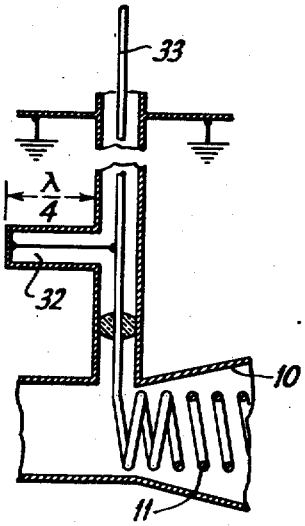
Figure 2D:
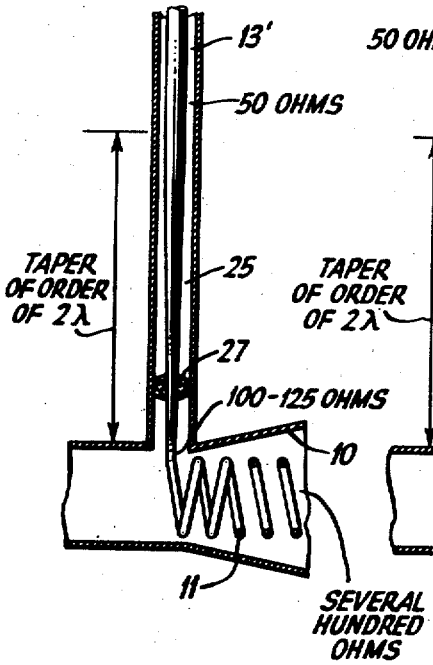
Figure 2E:
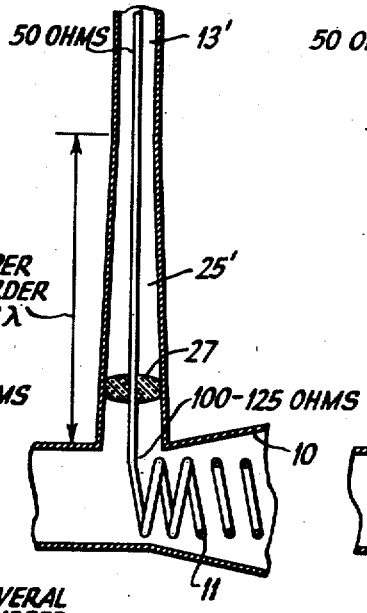
Figure 2F:
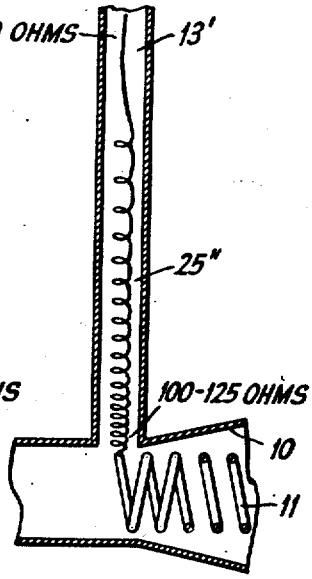

Figs. 2d, 2e and 2f show three different arrangements for connecting a transmission line link having tapering impedance between the last turn of the coil 11 and a 50 ohms coaxial transmission line shown as 13' in Figs. 2d, 2e and 2f. In Fig. 2d the transmission line link or impedance transformer, so to state, is labeled 25 and has an inner conductor of gradually increasing diameter. It should be noted that the length of the transmission line 25 is of the order of two wavelengths at the mean operating frequency. The inner conductor of the link 25 is relatively small at the end connected directly to the coil 11 and increases in diameter to a maximum at the end connected to the coaxial line 13'. The gradual change in diametric ratio between the inner and outer conductors of the link 25 effects the impedance transformation. Fig. 2e shows an arrangement equivalent to that of Fig. 2d, the difference being that this link identified as 25' has the outer conductor changing in diameter rather than the inner conductor. In Fig. 2f the transmission line link is identified as 25'' and has an inner conductor which is coiled and has closer spacing between turns thereof near the helical conductor 11 than near the coaxial line 13'. The radius of the spiral may also be made smaller as the pitch increases. The outer conductor diameter may also taper down in this direction. The three arrangements of Figs. 2d, 2e, and 2f are equivalent to each other and show an impedance transformation means for coupling the low impedance coaxial line 13' to the higher impedance terminal of the helical conductor 11.

It should be understood that the arrangements of Figs. 2d, 2e and 2f may be used at both terminals of the helical conductor 11, when the characteristic impedance of the helical conductor is not lowered to a point where it exactly matches that of the coaxial line to which it is connected. The arrangements of Fig. 1 as shown, or in combination with coupling circuits of Figs. 2d, 2e and 2f insure substantially perfect impedance matching between the helical conductor 11 and the input and output lines for all frequencies which can be amplified by the growing wave tube. The helical coil 11 is designed to have as low attenuation as practical without enabling undesired reflections along the coil 11 to produce parasitics.

Figs. 2a, 2b and 2c show arrangements which can be connected to the input and output radio frequency carrying lines for assuring suitable ground return. In Fig. 2a the coaxial line is shown connected to a folded dipole 30. Fig. 2b shows the coaxial line connected to a suitable wave guide 31 for receiving input waves from the wave guide or supplying amplified output waves to the wave guide. Fig. 2c shows a quarter wave stub 32 connected between the terminal of the helical conductor 11 and a sleeve type antenna 33.

In the arrangements of Figs. 2a to 2f inclusive only those portions of the growing wave amplifier tube of the invention have been shown which are necessary for an understanding of the principles involved. Thus, in these figures the conical tapering end of the metallic shell has been shown and only a few turns of the helical conductor 11 near one of its terminals. It will be understood that the remaining portion of the growing wave amplifier tube not shown in these figures may take the form shown in Fig. 1, or those of Figs. 3 and 4 described hereinafter.

In constructing the growing wave vacuum tube in accordance with the invention, it is advantageous to provide a coil 11 which has no loss at the frequencies to be amplified, so that as much as possible of the kinetic energy of the bunched electrons can be transferred to the working load. At other frequencies, it is of course immaterial whether a loss occurs internally or externally of the tube. The arrangement, however, should be such that sufficient loss is introduced to prevent parasitic oscillations, and one way that this can be done is by employing external trap circuits or deflecting circuits which will connect artificial loads (damping circuits) to the tube.

Fig. 3 shows an arrangement employing the principles of the invention, wherein parasitics can be prevented at very high frequencies outside the range to be amplified at which the conducting metallic shell 10 may provide undesired cavity resonance conditions. This is done by employing reactive impedance elements in the form of absorber resistors 50 connected to capacity pick-up plates 51. These pick-up plates 51 are uniformly distributed along at least a substantial portion of the length of the helical conductor 11 and have such dimensions that their reactance is very high in the operating frequency range but becomes low at frequencies higher than the highest operating frequencies. At these frequencies higher than the operating frequency, the low reactance between the helical conductor 11 and the capacity pick-up plates will permit sufficient current to pass into the resistors 50 to introduce the desired damping effect to prevent the production of standing waves on the conductor 11.

The tube with reactive impedance elements distributed along the helical conductor, as shown in Fig. 3, is claimed in my divisional application Serial No. 229,072, filed May 31, 1951.

Fig. 4 shows another embodiment of the invention wherein the growing wave amplifier tube is divided into two chambers one of which can be called an input chamber and the other of which an output chamber. The input chamber *contains a first primary* [includes the] cathode *14* and [the] *a first* helical conductor 11' along whose axis the electron [beam] *stream from cathode 14* passes. The conductor 11' serves to bunch the electrons passing therethrough. [One] *The input* end of the conductor 11' is connected to the input coaxial line 13, while the other end is terminated by a resistor 70 whose value matches the characteristic impedance of the helix 11' at that end. A suitable metallic partition 60 having an aperture 61 therein serves to separate the two chambers. The output chamber [includes a] *contains an annular* second *primary* cathode 80 [provided with] *coaxially surrounding the aperture 61,* a repeller electrode 81, a helical conductor 11'', and the collector electrode 12. It should be noted that the [terminal] *end* of the helical conductor 11'' which is nearest the partition [61] *60* is terminated by a resistor 71 of a value equal to the characteristic impedance of the helix 11'', while its other [terminal] *or output end* is connected to the output coaxial line 20. The repeller electrode 81 of the cathode arrangement in the output chamber is maintained at a negative potential relative to the cathode 80.

In the operation of the growing wave amplifier tube of Fig. 4, there is obtained [a beam] *an electron stream* of relatively low electron intensity at the input end of the tube in order to obtain an improved signal-to-noise ratio. High power output, however, requires greater electron [beam] intensity than is provided at the input end of the tube, and this is achieved by the use of the second cathode 80 which introduces additional electrons at a location where the input signal has been substantially amplified. The electrons from the first and second cathodes add to each other and pass through the interior of the second helix [11'] *11''.* Electrons passing through the first helix are bunched, and these bunched electrons passing through aperture 61 aid in bunching the electrons from the second cathode which pass through the helix 11''. The procedure indicated in Fig. 4 may of course be repeated, i. e. a second, a third, etc. partition may be introduced.

Although the helical conductor 11 in Figs. 1, 3 and 4 has been shown as having the same pitch throughout its length, it should be noted that it may be tapered toward the end near the collector electrode in order to slow down the waves on the conductor 11, to maintain substantial synchronism between the waves and the retarded electrons. The potential on the collector electrode will be held at suitable values depending on the speed of the electrons approaching it and may be maintained at a low negative or a small positive potential relative to the cathode.

In some cases it may be desired to maintain the helical conductor at a particular potential relative to ground. In such a case the helix can be isolated from the input and output coaxial lines from a direct current standpoint by means of blocking condensers, and the helix supplied with a suitable potential relative to the cathode.

The growing wave amplifier tube of the invention is particularly useful in a radio relaying system in amplifying an extremely wide band of radio frequency waves, and wherein the mean frequency is of the order of many hundreds or thousands of megacycles.

It should be understood that various modifications can be made in the figures of the drawings without departing from the spirit and scope of the invention. As an example, the non-magnetic envelope 10 may have the same diameter throughout its entire length, and the end portion of the helical conductor within the envelope may be tapered outwardly toward the envelope, in which case the same results would be obtained as in the case where the envelope is tapered inwardly as illustrated.

What is claimed is:

1. An electric tube comprising a helical conductor through the interior of which a stream of charged particles is adapted to pass, a hollow cylindrical element having a metallic surface surrounding said helical conductor over substantially the entire length thereof and spaced therefrom, the diameter of said element measured between oppositely disposed points on said surface increasing from a terminal of said helical conductor to a point intermediate the ends of said helical conductor, to thereby gradually change the characteristic impedance of said helical conductor, and means for coupling said terminal to a radio frequency circuit.

2. An electric tube comprising a helical conductor through the interior of which a stream of charged particles is adapted to pass, a hollow cylindrical element having a metallic surface surrounding said helical conductor over substantially the entire length thereof and spaced therefrom, the diameter of said element measured between oppositely disposed points on said surface increasing from both ends of said helical conductor to spaced points intermediate the ends of said helical conductor, the diameter of said surface between said spaced points being uniform, an input circuit coupled to one end of said helical conductor, and an output circuit coupled to the opposite end of said helical conductor.

3. An electron discharge device comprising a helical conductor, means for projecting a stream of electrons through the interior of said helical conductor, said helical conductor being positioned to be in energy coupling relation to said stream, a metallic shell surrounding said helical conductor and spaced therefrom, a transmission line having a characteristic impedance different from that of said helical conductor and coupled to said helical conductor, the spacing between said shell and helical conductor gradually decreasing from a point intermediate the ends of said helical conductor to the junction point of said line and helical conductor, whereby the characteristic impedance of said helical conductor gradually changes over that portion of the length thereof measured from said intermediate point to said junction point.

4. An electron discharge device comprising a helical conductor, means for projecting a stream of electrons through the interior of said helical conductor, said helical conductor being positioned to be in energy coupling relation to said stream, a metallic shell surrounding said helical conductor and spaced therefrom, a transmission line having a characteristic impedance different from that of said helical conductor and coupled to said helical conductor, the diameter of said shell gradually decreasing from a point intermediate the ends of said tube to the junction point of said line and helical conductor, whereby the characteristic impedance of said helical conductor gradually changes over that portion of the length thereof measured from said intermediate point to said junction point.

5. An electron discharge device comprising a helical conductor, a cathode and a collector electrode at opposite ends of said helical conductor, whereby a stream of electrons may pass from said cathode to said collector electrode, said helical conductor being in energy coupling relation to said stream of electrons, a metallic tube positioned coaxially with respect to said helical conductor and spaced therefrom, the spacing between said metallic tube and said helical conductor gradually decreasing from a point intermediate the ends of said device toward one end of said helical conductor, whereby the characteristic impedance of said helical conductor gradually changes from said point toward said one end, and a transmission line coupled to said one end of said helical conductor.

6. An electric tube comprising a helical conductor along the axis of said tube, means for projecting a stream of electrons coaxially with respect to said helical conductor, a hollow cylindrical non-magnetic metallic element also positioned coaxially with respect to said helical conductor and spaced therefrom and extending over substantially the entire length of said helical conductor, the spacing between said cylindrical metallic element and said helical conductor decreasing from a point intermediate the ends of said helical conductor toward one terminal of said helical conductor, whereby the characteristic impedance of said helical conductor changes over that portion of the length thereof measured from said intermediate point toward said one terminal, and a line adapted to carry radio frequency currents coupled to said one terminal.

7. An electron discharge device comprising a helical conductor, means for projecting a stream of electrons through the interior of said helical conductor, a metallic shell surrounding said helical conductor over substantially the entire length thereof and spaced therefrom, the spacing between said shell and said helical conductor increasing from both ends of said helical conductor toward spaced points intermediate the ends of said helical conductor, the diameter of said shell being uniform between said spaced points, means for producing a magnetic field having flux lines running parallel to the axis of said helical conductor, and coaxial transmission lines having characteristic impedances different from that of said helical conductor coupled to both ends of said helical conductor.

8. An electron discharge device as defined in claim 7, wherein said shell is the outer envelope of said device, and means are provided for sealing said envelope at the locations where said transmission lines join with said envelope.

9. An electron discharge device comprising first and second chambers placed longitudinally end-to-end, the side walls of said chambers being constituted by a continuous cylindrical metallic tube, means for projecting a stream of electrons from one chamber into and through the other chamber, a helical conductor in each of said chambers in energy transfer relation to said stream, the side walls of each chamber being spaced from the helical conductor contained therein, the spacing between the side walls of each chamber and the enclosed helical conductor being non-uniform and increasing from one terminal of the helical conductor toward a point intermediate the ends of said helical conductor, and a radio frequency carrying medium coupled to said one terminal.

10. An electron discharge device comprising first and second chambers placed longitudinally end-to-end, the side walls of said chambers being constituted by a continuous cylindrical metallic tube, means for projecting a stream of electrons from one chamber into and through the other chamber, a helical conductor in each of said chambers in energy transfer relation to said stream, the side walls of each chamber being spaced from the helical conductor contained therein, the spacing between the side walls of each chamber and the enclosed helical conductor being non-uniform and increasing from one terminal of the helical conductor toward a point intermediate the ends of said helical conductor, a radio frequency input coaxial line coupled to said one terminal of one helical conductor, and a radio frequency output coaxial line coupled to said one terminal of the other helical conductor.

11. An electron discharge device comprising first and second chambers placed longitudinally end-to-end, an apertured partition between said chambers for enabling electrons to pass therethrough, a cathode near that end of said first chamber farthest removed from said partition, and a cathode in said second chamber at a location near said partition and shielded by said partition from said first cathode, whereby the electrons emanating from the cathode in said second chamber add to the electrons emanating from said first cathode and passing through said partition.

12. An electron discharge device comprising first and second chambers placed longitudinally end-to-end, an apertured partition between said chambers for enabling electrons to pass therethrough, a cathode near that end of said first chamber farthest removed from said partition, and a cathode in said second chamber at a location near said partition, whereby the electrons emanating from the cathode in said second chamber add to the electrons emanating from said first cathode and passing through said partition, means for focusing the electrons from said cathodes into a stream passing in one general direction, and a helical conductor in each of said chambers positioned to be in energy coupling relation to said stream.

13. An electron discharge device comprising first and second chambers placed longitudinally end-to-end, the side walls of said chambers being constituted by a continuous cylindrical metallic tube, a helical conductor in each of said chambers positioned around the axis thereof, said chambers being separated by an apertured partition for enabling electrons to pass therethrough, a cathode in said first chamber arranged to pass a concentrated stream of electrons through the interior of the helical conductor in said first chamber and through the apertured partition, and a cathode in said second chamber located near said partition for producing additional electrons which add to the electrons from said first chamber for passing through the interior of the helical conductor in said second chamber, said helical conductors being in energy transfer relation to said electron stream, an input circuit coupled to the helical conductor in said first chamber, and an output circuit coupled to the helical conductor in said second chamber.

14. An electron discharge device as defined in claim 9, wherein said means for projecting a stream of electrons includes a cathode in each of said chambers.

15. An electron discharge device adapted to operate over a predetermined frequency range comprising a helical conductor, means for projecting a stream of electrons through the interior of said helical conductor, said helical conductor being positioned to be in energy coupling relation to said stream, a metallic shell surrounding said helical conductor and spaced therefrom, a transmission line having a characteristic impedance different from that of said helical conductor and coupled to said helical conductor, the spacing between said shell and helical conductor gradually decreasing from a point intermediate the ends of said helical conductor to the junction point of said line and helical conductor, a plurality of spaced capacity pick-up elements spaced from said helical conductor and connected to said shell through absorber elements, the reactance values of said pick-up elements being relatively high in said operating range of said discharge device and relatively low at frequencies higher than the highest operating frequency of said range.

16. An electric tube comprising a helical conductor effectively divided into two parts, means for projecting a stream of electrons coaxially with respect to said helical conductor and over substantially the entire length thereof, a hollow metallic shell surrounding said helical conductor and spaced therefrom, the diameter of said shell increasing from opposite ends of said helical conductor to spaced points intermediate said opposite ends, the diameter of said shell between said points being uniform, an input circuit coupled to one end of said helical conductor and an output circuit coupled to the opposite end of said helical conductor.

17. An electron discharge device comprising first and second chambers placed longitudinally end-to-end, an apertured partition between said chambers for enabling electrons to pass therethrough, a cathode near that end of said first chamber farthest removed from said partition, and a cathode in said second chamber at a location near said partition and shielded by said partition from said first cathode, whereby the electrons emanating from the cathode in said second chamber add to the electrons emanating from said first chamber and passing through said partition, means for focusing the electrons from said cathodes into a stream passing in one general direction, and a helical conductor in each of said chambers positioned to be in energy coupling relation to said stream.

*18. An electron discharge device comprising an elongated envelope containing means including a first cathode for projecting a first stream of electrons along a given path, means including a second cathode positioned along said path for projecting a second stream of electrons in space-charge-coupling relation to said first stream and in the same general direction, a helical conductor surrounding said path and coupled to at least one of said streams for modulating said stream in accordance with a signal to be amplified, means coupled directly to both of said streams in a region beyond said second cathode and said conductor for extracting amplified signal energy from said streams, and means for collecting said streams.*

*19. An electron discharge device as in claim 18, in which said energy-extracting means comprises a second helical conductor surrounding said path.*

*20. An electron discharge device as in claim 19, further including input and output transmission lines coupled to the input and output ends, respectively, of said two conductors, and resistive means terminating the other ends of said two conductors.*

*21. An electron discharge device comprising an elongated envelope containing means including a first primary cathode for projecting a first stream of electrons along a given path, means including a second primary cathode positioned along said path in spaced relation to said first cathode for projecting a second stream of electrons in space-charge-coupling relation to said first stream and in the same general direction, means interposed between said two cathodes and coupled to said first stream only for modulating said stream in accordance with a signal to be amplified, means coupled directly to both of said streams in a region beyond said second cathode for extracting amplified signal energy from said streams, and means for collecting said streams.*

*22. An electron discharge device as in claim 21, in which said second cathode is an annular electrode coaxially surrounding said path.*

*23. An electron discharge device as in claim 21, in which said modulating means comprises a helical conductor surrounding said path.*

*24. An electron discharge device as in claim 23, in which said energy-extracting means comprises a second helical conductor surrounding said path.*

*25. An electron discharge device as in claim 24, further including input and output transmission lines coupled to the input and output ends, respectively, of said two conductors, and resistive means terminating the other ends of said two conductors.*

*26. An electron discharge device as in claim 25, including conductive shield means surrounding said two helical conductors and to which said resistive means are connected.*

NILS E. LINDENBLAD.

References Cited in the file of this patent or the original patent

UNITED STATES PATENTS

| Number | Name | Date |
|---|---|---|
| Re. 21,739 | Llewellyn | Mar. 4, 1941 |
| 2,103,507 | Zworykin | Dec. 28, 1937 |
| 2,233,126 | Haeff | Feb. 25, 1941 |
| 2,289,756 | Clavier et al. | July 14, 1942 |
| 2,300,052 | Lindenblad | Oct. 27, 1942 |
| 2,367,295 | Llewellyn | Jan. 16, 1945 |
| 2,406,370 | Hansen et al. | Aug. 27, 1946 |
| 2,409,913 | Tonks | Oct. 22, 1946 |
| 2,575,383 | Field | Nov. 20, 1951 |
| 2,602,148 | Pierce | July 1, 1952 |